United States Patent Office 3,165,210
Patented Jan. 12, 1965

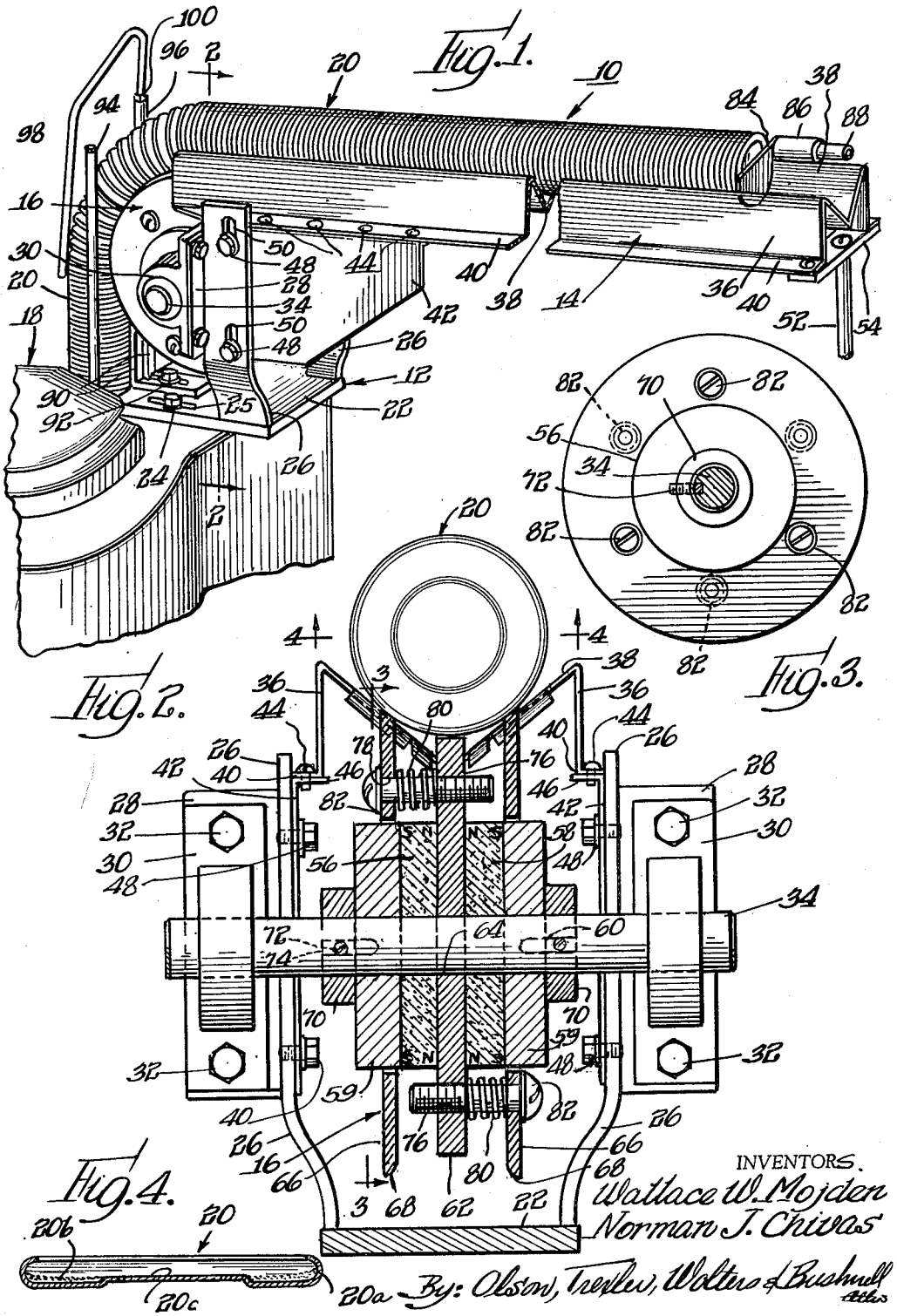

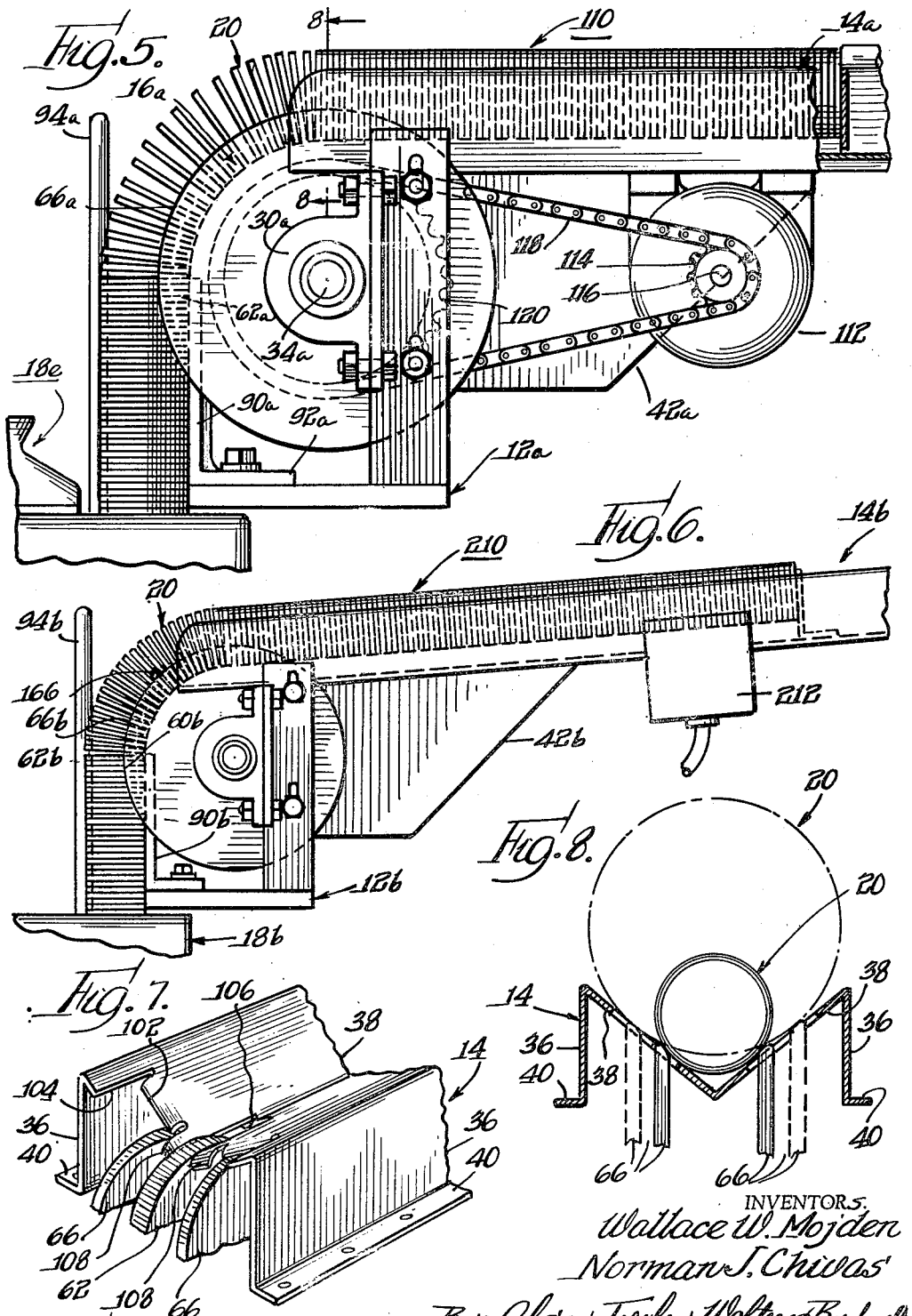

3,165,210
APPARATUS FOR HANDLING METAL
DISCS AND THE LIKE
Wallace W. Mojden, 8900 W. 102nd St., Palos Hills, Ill., and Norman J. Chivas, 1021 Forest Ave., Naperville, Ill.
Filed May 4, 1961, Ser. No. 107,799
18 Claims. (Cl. 214—7)

This invention relates to a conveyor mechanism, and particularly to apparatus for handling and conveying metal disc or can ends and the like.

During the manufacture of metal containers for foods and the like and more precisely after the can ends for the containers have been formed, a rubber-like sealing material is applied to the can ends in a coater machine so as to enhance the seal between the body and the ends of the can when it is subsequently closed and sealed. After being coated, the can ends are generally propelled upwardly out of the coater machine by a pusher mechanism, each successive end being inserted into the bottom of a vertical stack of can ends previously coated, thereby raising the ends disposed thereabove.

Heretofore, the vertical stack of coated can ends issuing from the coater machine were received into a vertically extending hopper. As the height of the stack of ends increased, the weight thereof affected the operation of the pusher mechanism on the coater, frequently causing jamming and other undesirable malfunctions. Hence, an operator was constantly required to be in attendance to remove a portion of the stacked can ends and to transfer that portion removed to a storage station. The number of coater machines an operator could attend was definitely limited by the manual stacking movements required of the operator. Another undesirable feature of the prior method and means employed to convey the can ends discharged from a coating machine was that the ring of sealing compound applied to each can end was not exposed to air sufficiently after issuing from the machine to promote drying of the sealing compound so as to relieve the tackiness which oftentimes caused the can ends to stick to one another. To reduce the tackiness of the newly applied sealing compound to an acceptable level, expensive auxiliary drying equipment was required in the can end conveying system.

Another problem in conveying can ends existed in the means and method used heretofore to feed a stack of ends into a seamer machine, that is, a machine where the can ends were applied to the body of the can either at the point of can manufacture or at the point where the packer filled the can with the food product. Heretofore, a vertical stack of can ends was fed downwardly into the seamer machine from a vertically extending supply station disposed adjacent thereto. As in the aforementioned situation above, the weight of the stacked ends was the limiting factor as to the number of ends which could be accommodated at one time on the seamer machine. Inasmuch as the supply at the machine was of necessity restricted, an operator in constant attendance was required to replenish the stack as it was consumed by the seamer machine.

Having in mind the shortcomings of prior handling apparatus, it is an important object of the invention to provide an improved mechanism for conveying metal can ends and the like between an operating station and a storage station which mechanism is adapted to accommodate a greater supply of can ends than was heretofore possible.

Another object of the invention is to provide an improved conveyor mechanism for holding metal can ends in a predetermined relationship each to the other, and to transfer such can ends from an operating station to a storage station.

Still another object of the invention is to provide an improved conveyor mechanism embodying magnetic means for holding can ends and to transfer such can ends from a storage station to an operating station.

Yet another object of the invention is to provide in a can end conveyor apparatus improved means for magnetically holding can ends in a spaced apart relationship to facilitate air drying of a sealing compound applied to the can ends at an operating station thereby to obviate auxiliary drying equipment.

Still another object of the invention is to provide in a can end conveyor apparatus of the type described, an improved magnetic means for holding the can ends on edge for conveying such can ends vertically from one station to another.

A further object of the invention is to provide a conveyor apparatus for metal can ends and the like which is of improved construction and arrangement, highly practical in use, economical to manufacture and operate, and which is flexibly adapted to the various purposes of can end conveyors.

Further features of the invention pertain to the particular arrangement of the elements thereof whereby the above-outlined and additional operating features thereof are attained.

The invention both as to its organization and method of operation, together with further objects and advantages thereof, will best be understood by reference to the following specification taken in connection with the accompanying drawings wherein like reference numerals have been used to designate like parts throughout, in which:

FIG. 1 is a fragmentary perspective view of a first form of conveyor apparatus made in accordance with and embodying the principles of the present invention, the apparatus being shown holding a supply of can ends and operatively mounted upon an associated machine such as a can end coater or a seamer;

FIG. 2 is an enlarged, vertical sectional view taken in the direction of the arrows along the line 2—2 in FIG. 1, certain parts being shown in elevation for purposes of clarity;

FIG. 3 is a vertical sectional view taken in the directions of the arrows along the line 3—3 in FIG. 2, particularly illustrating the means for adjusting the flanges of the roller or wheel shown in FIG. 2;

FIG. 4 is a sectional view taken in the direction of the arrows along the line 4—4 in FIG. 2 and illustrating a can end of the type adapted to be conveyed by the apparatus of the present invention;

FIG. 5 is a fragmentary, elevational view of a second form of conveyor apparatus of the present invention, the apparatus having drive means for rotating the magnetic wheel or roller at a predetermined speed to convey can ends from a vertical stack thereof disposed at an operating station to a horizontally disposed supply station;

FIG. 6 is an elevational view of a third form of conveyor apparatus of the present invention wherein vibrating means is provided to urge a substantially horizontally disposed stack of can ends toward the magnetic wheel or roller;

FIG. 7 is a fragmentary, perspective view of an end of the trough or chute disposed adjacent to the magnetic wheel or roller; and FIG. 8 is a diagrammatic end view of the trough and portions of the roller showing two of the positions to which the roller flanges may be adjusted.

Referring to FIGS. 1–4 of the drawings, there is shown therein a conveyor apparatus generally designated by the numeral 10 made in accordance with and embodying the principles of the present invention. The conveyor apparatus 10 is adapted to function as either an "upstacker" or as a "downstacker" handling mechanism. When operated as an upstacker, the conveyor 10 may be arranged adjacent to a can end coater machine or the like which applies a sealing compound to one surface of the can end. The treated can ends issue from a pusher mechanism on the coater machine into the bottom of a vertical column of previously treated ends thereby increasing the height of the column of can ends. As the uppermost ends in the column reach a predetermined elevation they enter a powerful magnetic field of a magnetic roller or wheel. The metal can ends are drawn to the magnetic roller and are held in edgeways disposition and arcuately spaced apart thereon to be carried a quarter turn upwardly by the roller to a substantially horizontally disposed chute or trough. The can ends may be permitted to accumulate in the trough or chute as an elongated horizontal stack. The chute or trough functions as a storage station for the can ends prior to the transfer thereof into a carton or other container. As an upstacker, the magnetic roller of the conveyor apparatus 10 may be propelled solely by the rising stack of can ends issuing from the pusher mechanism of the coater.

When operated as a downstacker, the conveyor apparatus 10 may be arranged adjacent to a can seamer or closer machine which applies the can end to the body portion of the casing. A long column of ends is arranged in a storage station such as a substantially horizontally disposed chute or trough which may be inclined somewhat to urge by gravity the can ends towards one end of the storage station whereupon the can ends enter a powerful magnetic field of a magnetic roller or wheel. The metal can ends are drawn to the magnetic roller and are held in edgeways disposition thereon to be carried a quarter turn downwardly into a vertically disposed column of previously conveyed ends arranged on the seamer or closer machine. As a downstacker, the magnetic roller of the conveyor 10 is propelled solely by the weight of the arcuately spaced can ends held thereon.

The detailed description of the conveyor apparatus 10 will now be set forth. Referring to FIG. 1, the conveyor apparatus 10 includes a frame 12 having mounted thereon a chute or trough 14 and a magnetic roller or wheel 16, the entire apparatus 10 being shown secured to an associated operating station which may be a coater or a liner machine as well as a can seamer or closer mechanism described hereinabove. A plurality of can ends 20 is shown arranged in the trough 14 and extends over the magnetic wheel 16 onto the operating station 18.

The frame 12 includes a base plate 22 secured in a horizontal disposition to the operating station 18 by fasteners 24 arranged in the elongated slots 25 to provide for adjusting the position of the conveyor apparatus 10 with respect to the operating station 18. A spaced pair of arms 26 extend upwardly from the base plate 22 at one end thereof, each arm 26 having an outwardly extending, vertically disposed wing plate 28 rigidly secured thereto such as by welding at the upper end thereof. A pillow block 30 is attached to each wing plate 28 by a pair of fasteners 32, the pillow blocks 30 being arranged on the frame 12 to rotatably support a horizontally extending axle shaft 34 having the magnetic roller or wheel 16 operatively mounted thereon.

The trough or chute 14 is an elongated, horizontally disposed member having substantial length such as from about 6 to 12 feet so as to function as a storage station for a long stack of can ends. Having an M-shaped transverse cross section, the trough 14 includes a pair of vertically disposed outer flanges 36 integrally joined at the upper edges thereof to a central, V-shaped web 38 in which the can ends 20 are supported in edgeways fashion. An outwardly extending, horizontally disposed flange 40 is integrally joined to each side flange 36 at the lower edges thereof. To vertically support the trough 14 on the frame 12, there is provided at one end of the trough 14 a vertically disposed gusset plate 42 on each flange 40, the gusset plate 42 being fixedly secured to the flange 40 by a plurality of fasteners 44 extending through an inwardly turned flange 46 on the upper edge of the gusset plate 42. Each gusset plate 42 is arranged inwardly of an associated arm 26 and is secured thereto by a pair of spaced apart fasteners 48, each fastener 48 extending through vertically elongated slot 50 in the arm 26 to provide a measure of vertical adjustment between the trough 14 and the frame 12. The end of the trough 14 away from the frame 12 is supported vertically from a surface (not shown) by a tubular strut 52 bolted to a cross member 54 extending between the flanges 40 immediately adjacent the end of the trough 14.

The magnetic roller or wheel 16 includes a first, short, cylindrically shaped magnet 56 and a second magnet 58 of an identical configuration to the first magnet 56, each magnet 56–58 having an axial bore 60 therein to receive the axle 34 therethrough. The magnets 56–58 are composed of permanently magnetic materials such as iron, alloys of copper, nickel, and iron composition, or of ceramic materials such as barium ferrite or the like which produce a strong magnetic field. Being that each magnet 56 and 58 has two large, substantially circular faces, one of the faces has a magnetic polarity opposite to that of the other face, which polarities are commonly designated north and south. In FIG. 2, the letters "N" are applied to the faces of the magnets 56–58 having like polarities, and these faces are shown abutting the opposite sides of a disc-shaped, ferrous metal center plate 62, the plate 62 having a central bore 64 to receive the axle 34 therethrough. The outer diameter of the center plate 62 is substantially greater than that of the magnets 56–58 whereby when the magnets and the center plate 62 are operatively mounted on the shaft 34 the peripheral edge of the center plate 62 is disposed radially outwardly of the peripheral surfaces of the magnets 56–58. When composed of iron or carbon steel, the center plate 62 serves to focus the magnetic energy from the N pole face of each magnet 56–58 thereby to provide a single, strong N magnetic pole on the wheel 16.

In FIG. 2, the letters "S" are applied to the faces of the magnets 56–58 having like polarity and these faces are shown disposed away from the center plate 62. Abutting the pole face S of each magnet 56–58, a disc-like pole shoe 59 is provided, each pole shoe 59 being composed of a ferrous metal and having a bore to receive the axle 34 therethrough. The pole shoes 59 have substantially the same outside diameter as the magnets 56–58 whereby the curved outer surfaces of the parts 56, 58 and 59 are substantially flush when operatively mounted on the axle 34. When composed of iron of carbon steel, the pole shoes 59 serve to focus the magnetic energy from the S pole face of the respectively associated magnet 56 or 58 thereby to provide two, strong S magnetic poles on the wheel 16 disposed axially outwardly of a central N magnetic pole.

An annular flange 66 of ferrous material such as iron, is mounted about each pole shoe 59, the annular flange 66 having an inner diameter complementary to the outer diameter of the pole shoes 59 and magnets 56–58 so as to be slidably received thereover. The outer diameter of the annular flange 66 is substantially greater than that of the center plate 62 whereby when the parts 56, 58, 59, 62, and 66 are operatively mounted, the inwardly rounded peripheral edges 68 of the flanges 66 are disposed radially outwardly of the center plate 62. Each annular flange 66 being in engagement or in proximate contact with a pole shoe 59, the flanges 66 serve as extensions of the S poles of the wheel 16 whereby the magnetic energy from the S pole faces of the magnets 56–58 is focused therein.

To magnetically insulate the magnets 56–58 from the frame 12, the axle shaft 34 is formed from non-magnetic materials, such as aluminum, non-magnetic stainless steel, such as aluminum, non-magnetic stainless steel, brass, brass, bronze, and the like thereby to concentrate the strong magnetic field about the annular flanges 66 and the center plate 62.

A pair of collars 70 is fixedly secured to the shaft 34 adjacent to the outwardly disposed faces of the pole shoes 59 for holding the pole shoes 59, the magnets 56–58 and the center plate 62 in their proper relationships. Being secured by a set screw 72 and a key 74, each collar 70 is restrained from axial and rotational movements with respect to the axle shaft 34.

To vary the distance between each annular flange 66 and the center plate 62, means for adjustment is provided on the magnetic roller 16, shown best in FIGS. 2 and 3. More specifically, six arcuately spaced, threaded holes 76 are arranged in the center plate 62 on a bolt circle disposed outwardly of the magnets 56–58, and each annular flange 66 is provided with three holes 78 equally spaced on a complementary bolt circle. The holes 76 and 78 being in alignment, a helically wound compression spring 80 extends between the center plate 62 and the flange 66 in register with the holes 76–78. The spring 80 and the holes 76–78 receive therethrough a cap screw 82 which threadedly engages the center plate 62 within the hole 76. When the three cap screws 82 in one of the flanges 66 are rotated for advancement into the threaded holes 76, the flange 66 is urged along the magnet toward the center plate 72 thereby compressing three springs 80. Antithetically, when the three cap screws on one of the flanges 66 are rotated for retrograde movement from the holes 76, the flange 66 is urged away from the center plate 62 by the forces in the compression springs 80. Thus, it is seen that the span between the two flanges 66 may be adjusted to accommodate can ends of varying diameters.

In FIG. 2, a can end 20 is shown magnetically gripped at its edges on the wheel 16 by the spaced flanges 66 and the center plate 62. The end 20 may be in firm engagement with the center plate 62 or may be spaced a small distance away therefrom without impairing the strong magnetic gripping forces produced by the plate 62 in association with the flanges 66. Referring to FIG. 4, the can end 20 has an inwardly turned peripheral edge 20a known in the canning industry as a "curl." Radially inwardly of the curl 20a a rubber-like sealing compound 20b is applied to the inner surface of the end 20 to afford a proper seal with an associated can body (not shown). A center expansion panel 20c is disposed inwardly of the sealing compound 20b to afford additional stiffening to the can end 20.

To maintain a long column of can ends in a stacked relationship within the trough or chute 14, a sliding abutment plate 84 is provided, shown best in FIG. 1. The abutment plate 84 is shaped generally complementary to the V-shaped web 38 of the trough 14 and affords a vertical surface to engage and support the end of the column of the stacked ends 20. A sleeve 86 is joined to one side of the sliding abutment 84 slidably embracing a horizontally disposed tubular rail 88 arranged outwardly of the trough 14 above a side flange 36 and extends substantially the entire length of the trough 14. The sleeve 86 may be provided with spring means to urge the abutment plate 84 towards the wheel 12. Alternatively, the sliding abutment plate 84 may be urged away from the wheel 12 as an increasing number of ends 20 are fed into the trough 14 from the operating station 18.

To maintain a vertical column of can ends 20 in proper alignment adjacent to the magnetic wheel 16, a pair of vertically extending guide pins 90 are arranged on the base plate 22 secured to a horizontally disposed lug 92, shown best in FIG. 1. The pins 90 are disposed axially inwardly of the wheel flanges 66 and prevent the stack of can ends 20 from being moved beneath the wheel 16. Two vertical rods 94 and 96 which are substantially taller than the pins 90 are arranged on the operating station 18 to prevent the column of ends 20 from being moved away from the wheel 16. A vertically downwardly extending rod 98 is arranged intermediate and outwardly of the rod 94–96, the rod 98 being fixedly secured at an upper curved portion thereof to the rod 96 by a cooperating bushing 100. It is seen that by the arrangement of the members 90, 94, 96 and 98 the vertical column of can ends is maintained in proper relationship with respect to the magnetic wheel 16.

When the conveyor apparatus functions as an upstacker, the can ends 20 are discharged from the coater machine at the operating station 18 and are thrust between the rods 94 and 96 to abut the guide pins 90 below the wheel 16. As each additional can end with the newly applied sealing compound 20b thereon is inserted under the next preceding end 20, a vertical stack of can ends 20 is generated and increases in height until the topmost ends 20 engage the center plate 62 and the flanges 66 of the magnetic wheel 16. The wheel 16 is caused to rotate by the growth of the stack of ends 20 and conveys the magnetically gripped ends 20, which extend radially from the wheel 16, generally one quarter turn upwardly into the receiving end of the trough 14. In their radial disposition, the can ends 20 are arcuately spaced each from the other to afford contact with air to promote further drying of the sealing compound 20b, newly applied thereto.

To afford a smooth transfer of can ends 20 from the wheel 16 into the trough 14, the receiving end of the trough 14 is provided with lip flanges 102, shown best in FIG. 7. More particularly, the end portion of the trough web 38 is cut out as at 104 to afford clearance for the flanges 66 of the wheel 16, the lip flange 102 being formed at the base of the cutout 104 by a downwardly curved portion of the web 38. The center plate 62 of the wheel 16 extends through a central slot 106 in the web 38, a pair of downwardly curved lip flanges 108 being provided on each side of the slot 106. It is to be appreciated that the width of the slots 104 is of a size so as to accommodate for adjusting the span between the annular rollers 68.

Referring now to FIG. 8, there is shown in diagrammatic representation the relationship of the flanges 66 to the receiving end of the trough 14 when large and small can ends 20 are conveyed in the apparatus 10. When the flanges 66 are widely spaced to accommodate a large can end 20 the receiving end of the trough 14 having the cutouts therein is lowered with respect to the frame 12. Referring to FIG. 1, the lowering operation is accomplished by loosening the fasteners 48 disposed in the elongated slots 50 and sliding the entire trough end vertically into the proper relationship with the wheel 16. Similarly, when the annular flanges 66 are disposed closer together so as to accommodate a smaller size of can end 20, the end of the trough 14 is raised by adjusting the fasteners 48 as previously described.

When the conveyor apparatus 10 functions as a downstacker, a stack of can ends is disposed on edge in the trough 14 with the sliding abutment plate 84 in engagement with the end of the stack disposed away from the wheel 16, as shown in FIG. 1. As the stack of ends 20 is urged by gravity or other means toward the wheel 16 the can ends adjacent the wheel are gripped in the magnetic field provided by the flanges 66 and center plate 62 and are held in a radially extending disposition with respect to the wheel 16. As more ends 20 are received on the magnetic wheel 16 to extend radially outwardly therefrom, the weight of the ends on the wheel causes the wheel to rotate thereby carrying the ends through a curved path of about one quarter turn downwards to be swept from the wheel by the guide pins 90 thereafter to fall into a vertical stack on the operating station 18. It is to be appreciated that the rod 98 cooperating with the rods 96 and 94 provide a receiving station for the vertical column of can ends 20 conveyed downwardly from the trough 14 by the magnetic wheel 16.

There is shown in FIG. 5 a second form of conveyor apparatus generally designated by numeral 110 made in accordance with and embodying the principles of the present invention. The conveyor apparatus 110 is a motorized upstacker and includes numerous parts similar to those previously described and, accordingly, designated with the respectively corresponding numerals having a suffix letter "a" applied thereto. A prime mover 112 is secured to the trough 14a, the prime mover 112 being an electric motor or the like having a speed control. A sprocket 114 secured to a shaft 116 of the motor 112 engages a continuous drive chain 118 which extends over and engages a sprocket 120 mounted on the shaft 34a of the magnetic wheel 16a. When power is supplied to operate the motor 112 the wheel 16a rotates at a predetermined speed in a clockwise direction as viewed in FIG. 5. The topmost can ends 20 in the vertical column disposed adjacent to the wheel 16 are gripped by the wheel 16a and carried substantially a quarter turn upwards until they engage the receiving end of the trough 14a. Thus it is seen by motorizing the upstacker 110 to rotate the magnetic wheel 16a the downward load due to weight of the can ends on the coater machine mechanism is substantially reduced. This arrangement reduces maintenance to the associated coater machinery and prevents damage to the can ends 20 caused by jamming or other malfunctions of the coater mechanism due to the vertical loads of can ends.

There is shown in FIG. 6 a third form of conveyor apparatus generally designated by the numeral 210 made in accordance with and embodying the principles of the present invention. The conveyor apparatus 210 is adapted to function as a downstacker wherein a vibrating means is provided to urge the can ends 20 toward the magnetic field of the rotatable wheel. The downstacker 210 includes numerous parts identical to those described above and, accordingly, such parts are designated with the respectively corresponding numerals having the suffix letter "b" applied thereto.

An electrically powered vibrator 212 is mounted on the trough 14b of the downstacker 210 and imparts a slight shaking motion to the can ends 20 supported in the trough 14b, the trough 14b being slightly inclined towards the magnetic wheel 16b. When the vibrator 212 is actuated the can ends 20 are urged along the trough 14b towards the wheel 16b to be engaged thereby, thus causing the wheel 16b to rotate and carry the ends 20 gripped thereon downwardly along a curved path to be received in a stack of can ends disposed therebelow.

An important advantage of the downstacker 210 is that a substantial supply of can ends may be disposed in the trough 14b, the length of the stack of can ends being as long as six to twelve feet. Therefore, one operator can handle several machines and not be required to be in constant attendance at a single machine as was the practice heretofore.

In view of the foregoing, it is apparent that there has been provided an improved conveying apparatus having a magnetic wheel or roller for conveying can ends between a vertical and horizontal position, the ends being conveyed along a curved path by the wheel in an arcuately spaced, face to face or fanned relationship each to the other.

While there have been described certain preferred embodiments of the invention, it will be understood that various modifications may be made therein, and it is intended to cover in the appended claims all such modifications as fall within the true spirit and scope of the invention.

The invention is claimed as follows:

1. A handling mechanism for can ends composed of magnetically attractable material to convey such can ends with respect to an operating station; said mechanism comprising a trough for supporting a stack of closely juxtaposed can ends, said trough having an open end thereof vertically spaced from the associated operating station, a rotatable roller disposed intermediate said open end and the operating station and adjacent thereto, and magnetic gripping means on said roller operable to grip along a trio of axially spaced portions of said roller each of a group of can ends at the respective edges thereof to present the can ends in an outwardly extending, face to face relationship with each can end in a plane substantially normal to a tangent of said path to convey the can ends between said open end of said trough and the operating station.

2. A handling mechanism for can ends composed of magnetically attractable material to convey such can ends with respect to an operating station; said mechanism comprising a trough for supporting on edge a plurality of can ends in stacked relationship, said trough having an open end vertically spaced from the associated operating station, a rotatable roller disposed intermediate and mutually adjacent to said open end and the operating station, a pair of axially spaced first portions on said roller having a first magnetic polarity, and a second portion on said roller spaced axially intermediate said first portions and having a second magnetic polarity opposite to said first polarity, said first and second portions being arranged to magnetically coact to grip the can ends at spaced points along the edges thereof to extend in a face to face relationship, radially outwardly of said roller for conveying said can ends between said open end of said trough and the associated operating station.

3. A handling mechanism for can ends composed of magnetically attractable material to convey such can ends with respect to an operating station; said mechanism comprising a trough for supporting on edge a plurality of can ends in stacked relationship, said trough having an open end vertically spaced from the associated operating station, a rotatable roller disposed intermediate and mutually adjacent to said open end and the operating station, drive means to rotate said roller, a pair of axially spaced flanges on said roller having a first magnetic polarity, and a circumferential portion on said roller axially intermediate said flanges each having a second magnetic polarity opposite to said first polarity, said flanges and said circumferential portion being arranged to magnetically coact for gripping the can ends at spaced points along their edges to extend radially outwardly from said roller disposed in a spaced, face to face relationship while traversing the path between said open end of said trough and the associated operating station.

4. The combination set forth in claim 3 wherein means are included on said trough to urge the stack of can ends toward said open end.

5. The combination set forth in claim 3 wherein vibrating means are provided to urge the stack of can ends toward the open end of said trough.

6. A handling mechanism for can ends composed of magnetically attractable material to convey such can ends from a supply station to an operating station; said mechanism comprising a supply station including a trough for supporting on edge a plurality of can ends in stacked relationship, said trough having a discharge end vertically spaced above the associated operating station, a rotatable roller disposed intermediate and mutually adjacent to said discharge end and the operating station, a pair of axially spaced first portions on said roller having a first magnetic polarity, and a second portion on said roller spaced axially intermediate said first portion having a second magnetic polarity opposite to said first polarity, said first and second portions being arranged to magnetically coact to grip the can ends at spaced points along the edges thereof to extend in a face to face relationship radially outwardly from said roller for conveying such can ends from said supply station toward the associated operating station.

7. A handling mechanism for can ends composed of magnetically attractable material to convey such can ends from a supply station to an operating station; said mechanism comprising a supply station including a trough for supporting on edge a plurality of can ends in stacked relationship, said trough having a discharge end vertically spaced above the associated operating station, a rotatable roller disposed intermediate and mutually adjacent to said discharge end and the operating station, a pair of axially spaced flanges on said roller each having a first magnetic polarity, and a circumferential portion on said roller axially intermediate said flanges having a second magnetic polarity opposite to said first polarity, said flanges and said circumferential portion being arranged magnetically to coactingly grip the can ends gripped at spaced points along their edges to extend radially outwardly from said roller disposed in a spaced, face to face relationship while traversing the path from said supply station to the associated operating station.

8. The combination set forth in claim 7 wherein means are provided for varying the axial distance between said flanges and said circumferential portion.

9. A handling mechanism for can ends composed of magnetically attractable material to convey such can ends from an operating station to a supply station; said mechanism comprising a supply station including a trough for supporting on edge a plurality of can ends in stacked relationship, said trough having a receiving end vertically spaced above the associated operating station, a rotatable roller disposed intermediate and mutually adjacent to said receiving end and the operating station, magnetic gripping means on said roller operable to grip along a trio of axially spaced magnetic portions of said roller each of a group of can ends at the respective edges thereof to present the can ends in an outwardly extending, face to face relationship with each can end in a plane substantially normal to a tangent of said path, and drive means for rotating said roller and said magnetic gripping means to convey towards said receiving end of said supply station the topmost can ends from a vertical stack thereof at the associated operating station.

10. The combination set forth in claim 9 and further including guide means proximate the operating station and arranged adjacent to the outer periphery of said roller for maintaining the can end in vertical stacked relationship.

11. A transfer apparatus for conveying magnetically attractable, substantially planar articles, comprising: rotatably mounted, article-transfer means to magnetically grip such an article for translating it through a predetermined path; supply means adjacent the initial portion of said path to present the article for acceptance by said transfer means; and retrieving means adjacent the terminal portion of said path for causing the article to become disengaged from said transfer means, said rotatable transfer means including a plurality of magnet means arranged to present a trio of magnetic gripping zones spaced from each other laterally of said path and extending generally parallel with said path for gripping the article against said rotatable transfer means outstandingly in a plane normal to a tangent of said path and laterally with respect to said path.

12. A transfer apparatus for conveying magnetically attractable, substantially planar articles, comprising: rotatably mounted, article-transfer means to magnetically grip such an article for translating it through a predetermined path; supply means adjacent the initial portion of said path to present the article for acceptance by said transfer means; and retrieving means adjacent the terminal portion of said path for causing the article to become disengaged from said transfer means, said rotatable transfer means including a plurality of magnet means arranged to present a trio of magnetic gripping zones extending generally parallel with said path for gripping the article outstandingly in a plane normal to a tangent of said path, the outer ones of said gripping zones being of a like magnetic polarity, the central gripping zone being of magnetic polarity opposite to that of said outer zones.

13. A transfer apparatus for conveying magnetically attractable, substantially planar articles, comprising: rotatably mounted, article-transfer means to magnetically grip such an article for translating it through a predetermined arcuate path; supply means adjacent the initial portion of said path to present the article for acceptance by said transfer means; and retrieving means adjacent the terminal portion of said path for causing the article to become disengaged from said transfer means, said rotatable transfer means including a pair of magnet means each having first and second pole portions of opposite polarity, said first pole portions of said pair of magnet means being arranged generally centrally of said path, said second pole portions of said pair of magnetic means being arranged along opposite side portions of said path, whereby said rotatable transfer means present a plurality of magnetic peripheries extending along said path to magnetically grip the article outstandingly in a plane substantially normal to a tangent of said path.

14. A transfer apparatus for conveying magnetically attractable, substantially planar articles, comprising: rotatably mounted, article-transfer means to magnetically grip such an article for translating it through a predetermined arcuate path; supply means adjacent the initial portion of said path to present the article for acceptance by said transfer means; and retrieving means adjacent the terminal portion of said path for causing the article to become disengaged from said transfer means, said rotatable transfer means including a pair of magnet means each having first and second pole portions of opposite polarity, said first pole portions of said pair of magnet means being arranged in proximal confronting relationship generally centrally of said path, second pole portions of said pair of magnet means being arranged in distal relationship along opposite sides of said path, whereby said rotatable transfer means present a plurality of magnetic peripheries extending along said path to magnetically grip the article at the respective edges thereof to convey the article through said arcuate path in an outwardly extending face to face relationship with each end in a plane substantially normal to a tangent of said path.

15. A transfer apparatus for conveying magnetically attractable, substantially planar articles, comprising: rotatably mounted article transfer means to magnetically grip such an article for conveying it through a circular path; supply means adjacent the initial portion of said path to present the article for acceptance by said transfer means; and retrieving means adjacent the terminal portion of said path for causing the article to become disengaged from said transfer means, said rotatable transfer means including a pair of permanent magnets each having first and second pole faces of opposite polarity arranged parallel to said path, said first pole faces of like polarity being confrontingly arranged proximate the center of said path, said second pole faces of like polarity being arranged along opposite sides of said path, said rotatable transfer means further including pole extension means substantially surrounding each said first and second pole faces to provide magnetic gripping peripheries for holding the article outstandingly in a plane normal to a tangent of said path.

16. A handling mechanism for can ends and the like composed of magnetically attractable material, to convey such can ends along a predetermined path from an operating station to a supply station, comprising: a supply station adapted to receive and hold a plurality of can ends disposed on the edges thereof, said supply station having a receiving opening therein arranged vertically above the associated operating station; rotatable magnetic gripping means disposed in such path intermediate said receiving opening and the operating station and mutually adjacent thereto; and drive means for rotating said magnetic gripping means, said rotatable magnetic means including a plurality of permanent magnets spaced from each other laterally of such paths and arranged to present a trio of magnetic gripping zones extending generally parallel to such path between the operating station and said receiving opening, the outer two zones of said trio having a polarity opposite from that of the intermediate zone of said trio whereby lines of magnetic force emanating from each to said outer zones extend laterally of such path and converge in said intermediate zones thereby said permanent magnets coact on said rotatable magnetic means for gripping the uppermost can ends from a vertical stack thereof, at the associated operating station and to hold such can ends on their edges in an outwardly extending face to face relationship with each can end in a plane substantially normal to a tangent to said path when conveying such ends toward said supply station.

17. A handling mechanism for can ends composed of magnetically attractable material to convey such can ends with respect to an operating station; said mechanism comprising a trough for supporting a stack of closely juxtaposed can ends, said trough having an open end thereof vertically spaced from the associated operating station, a rotatable roller disposed intermediate said open end and the operating station and adjacent thereto, and magnetic gripping means on said roller operable to grip along a plurality of axially spaced portions of said roller each of a group of can ends at the respective edges thereof to convey the can ends through an arcuate path between the open end of said trough and the operating station and to present the can ends in an outwardly extending face to face relationship with each can end in a plane substantially normal to a tangent of said path.

18. The handling mechanism of claim 17 wherein said magnetic gripping means on said roller comprises a first magnetic means more remotely spaced from the center line and second magnetic means more closely spaced from the center line, said second magnetic means being of opposite polarity whereby said first and second magnetic means induce a magnetic flux in a can end to be conveyed thereon.

References Cited in the file of this patent
UNITED STATES PATENTS

| | | |
|---|---|---|
| 1,513,619 | Luehrs | Oct. 28, 1924 |
| 2,421,874 | Fouse | June 10, 1947 |
| 2,731,137 | Socke | Jan. 17, 1956 |
| 2,743,001 | Nordquist | Apr. 24, 1956 |
| 2,819,788 | Howard | Jan. 14, 1958 |
| 2,862,601 | Littwin | Dec. 2, 1958 |